3,725,257
PROCESS OF SEPARATING AROMATIC HYDROCARBONS FROM HYDROCARBON MIXTURES

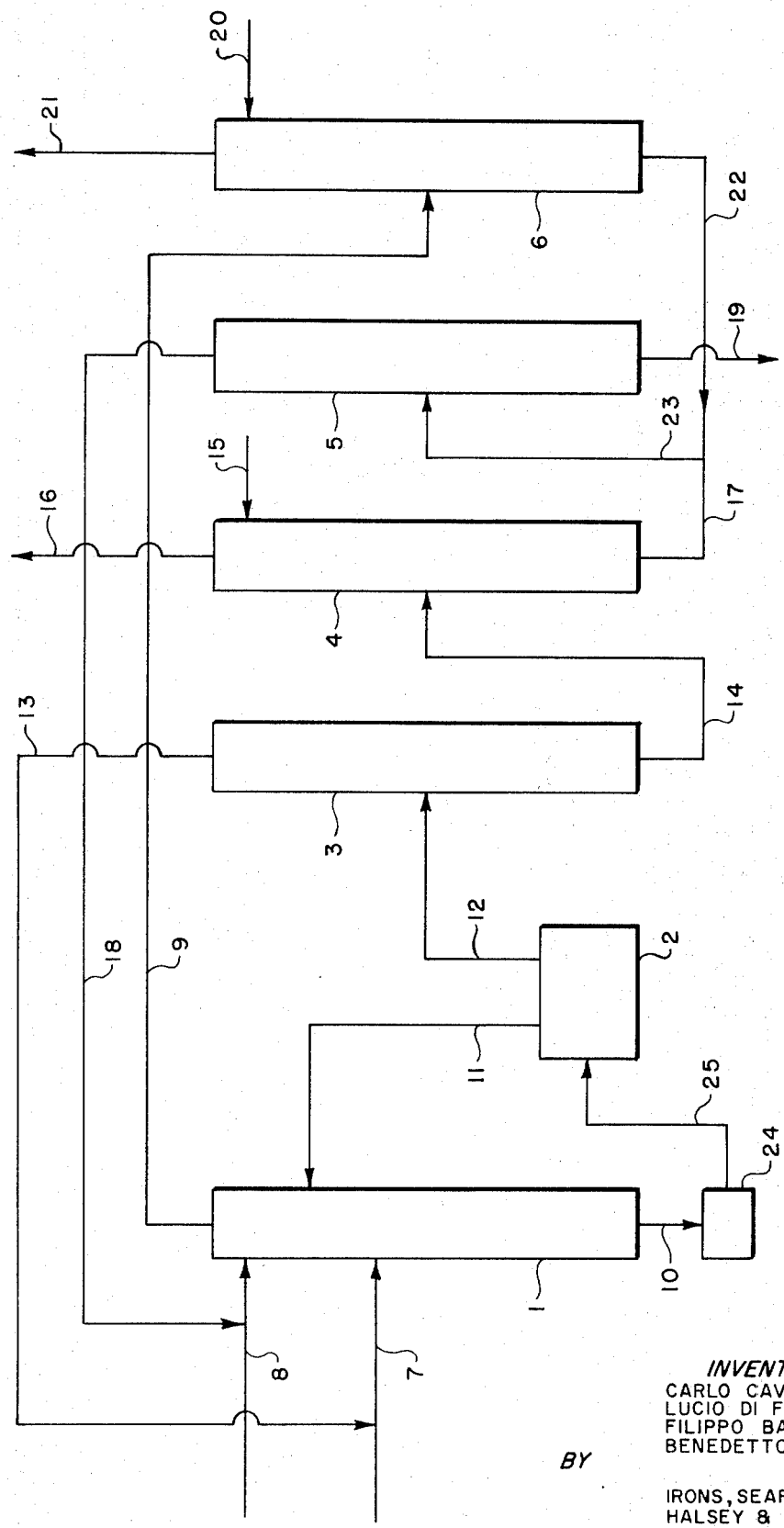

Carlo Cavenaghi, Lucio di Fiore, Filippo Barilli, and Benedetto Calcagno, Milan, Italy, assignors to Societa Italiana Resine, S.p.A., Milan, Italy
Filed May 4, 1971, Ser. No. 140,201
Claims priority, application Italy, May 12, 1970, 24,460/70
Int. Cl. C07c 7/10; C10g 21/20
U.S. Cl. 208—331                        11 Claims

ABSTRACT OF THE DISCLOSURE

Aromatic hydrocarbons are separated from a mixture of liquid hydrocarbons. The mixture of liquid hydrocarbons is extracted in the liquid phase in an extraction zone at a temperature from about 40° C. to about 80° C. with ethylenediamine solvent having a water content of from 0% to 20% by weight to form an extracted phase and a raffinate phase. The extracted phase comprises predominantly aromatic hydrocarbons, solvent and a minor amount of non-aromatic hydrocarbons. The raffinate phase comprises predominantly non-aromatic hydrocarbons. The extracted phase and the raffinate phase are separately collected. The extracted phase is cooled to a temperature at least 30° C. lower than the temperature of the extraction step and then separated into a heavier solvent containing phase and a lighter hydrocarbons containing phase. The non-aromatic hydrocarbons in the lighter hydrocarbons containing phase are separated as overhead product by means of extractive stripping at atmospheric pressure. The aromatic hydrocarbons remain in the residue of the extractive stripping which is then scrubbed with water to thereby obtain an aromatic hydrocarbons phase and an aqueous ethylenediamine containing phase. The aromatic hydrocarbons phase is then rectified.

BACKGROUND OF THE INVENTION

Field of the invention

This invention relates to a means of separating aromatic hydrocarbons from a mixture thereof with paraffins and naphthene hydrocarbons by means of extraction with a selective solvent. This invention is particularly concerned with separating aromatic hydrocarbons, such as benzene, toluene and xylene, from liquid hydrocarbon mixtures containing them.

Description of the prior art

There are several known methods employed on an industrial scale for separating mixtures of organic compounds which contain at least one constituent relatively soluble in a liquid solvent, by contacting the liquid mixtures with a liquid solvent in order to separate a raffinate phase from an extracted phase.

Previous methods have effected the separation by conveying the liquid mixtures to a liquid-liquid extractor countercurrent to a selective solvent. A raffinate phase and an extracted phase are collected, the raffinate phase consisting essentially of non-aromatic hydrocarbons, and the extracted phase having a high solvent and aromatic hydrocarbon content and a relatively low non-aromatic hydrocarbon content.

A number of high-boiling solvents have been used as the selective solvent in the extractive step. Among the solvents used in the past on the industrial scale are diethylene glycol, dipropylene glycol, and sulfolane.

It is known to vary the selectivity of such solvents by adding a non-solvent such as water.

Even where a non-solvent is employed, there is an appreciable loss to the raffinate phase of the aromatic hydrocarbons which it is desired to isolate. The extracted phase always contains relatively high quantities of non-aromatic hydrocarbons which must be separated in order to obtain the aromatic hydrocarbons in pure form.

Various processes have been employed to separate the aromatic hydrocarbons from the solvent and non-aromatic hydrocarbons in the extracted phase. For example, the extracted phase is conveyed to an extractive distillation column in which the non-aromatic products are separated at the top of the column, the aromatic constituents are withdrawn laterally, and the solvent is withdrawn at the bottom of the column.

The non-aromatic products, with the solvent, are recycled to the extractor, and the aromatic hydrocarbons which have been isolated are rectified. In most instances, the extractive distillation step required by these methods must be carried out using steam in a vacuum.

Previous processes have required the recycling of large amounts of aromatic products to the extractor together with the paraffinic products which are distilled from the extracted phase. Such processes have not been economical because of the expense required to provide large quantities of steam which was employed in order to separate the aromatic content from the solvent in the extract, through repeated distillations.

In these processes, since organic solvents are employed, there is a certain solvent loss which always occurs due to heat decomposition of solvent during the distillation step. This entails the necessity of regenerating and purifying at least a part of the solvent.

U.S. Pat. No. 2,407,820 discloses the extraction of aromatic hydrocarbons from a mixture of hydrocarbons containing them by the use of selective solvent such as sulfolane followed by extractive distillation of the extracted phase in order to isolate the aromatic hydrocarbons.

British Pat. 739,200 discloses a process for separation of aromatic hydrocarbons from a mixture thereof with non-aromatic hydrocarbons by extraction of the aromatic hydrocarbons from the mixture with a glycolic selective solvent and then treating the aromatic rich glycolic extract by pre-stripping the extract under evaporative conditions to liberate the most volatile aromatics therefrom together with non-aromatics of equivalent volatility, and thereafter conducting the remaining extract to a heated zone and stripping the aromatic hydrocarbons from the solvent in the heated zone.

Cumming and Morton in the Journal of Applied Chemistry, Aug. 3, 1953, disclose the use of ethylenediamine for extracting benzene from n-hexane on a laboratory scale. Repeated extractions are required to obtain a benzene-free raffinate, but a hexane-free extract of benzene is not attained.

GENERAL DESCRIPTION OF THE INVENTION

According to the present invention, there is provided an improved process of separating aromatic hydrocarbons from a mixture thereof with paraffin and naphthene hydrocarbons by a unique combination of steps which provides an economical means of separating the aromatic hydrocarbons from mixtures thereof and obtaining such aromatic hydrocarbons in a high degree of purity in high yields.

It has now been found that by utilizing the process of the present invention many of the disadvantages of the prior art can be avoided by extracting aromatic hydrocarbons from liquid hydrocarbon mixtures containing the aromatic hydrocarbons by utilization of ethylenediamine as a selective solvent.

The aromatic hydrocarbons in the extracted phase are then recovered in a pure form by freeing the extracted phase of solvent, removing the small amounts of non-aromatic constituents by means of an extractive stripping technique, and rectifying the aromatic hydrocarbon enriched portion of the extracted phase.

It is an object of the present invention to provide a means for separating very pure aromatic hydrocarbons in exceptionally high yields from hydrocarbon mixtures containing such aromatic hydrocarbons together with paraffin and naphthene hydrocarbons.

It is also an object of this invention to provide a liquid-liquid extraction method for separating an extracted phase having a high aromatic hydrocarbon content and a very low non-aromatic hydrocarbon content from a liquid hydrocarbon mixture.

This invention also provides a method for separating aromatic hydrocarbons from the extracted phase by subjecting only a portion of the extracted phase to extractive stripping techniques.

Other objects of the invention will be apparent from the following description of the invention.

The process of this invention, in brief, comprises:

(a) charging the liquid hydrocarbon mixture to be separated to an extraction zone countercurrent to ethylenediamine as the selective solvent;
(b) collecting from the extraction zone a liquid extracted phase which is loaded with aromatic hydrocarbons and a liquid raffinate phase comprising essentially non-aromatic hydrocarbons;
(c) cooling the extracted phase containing the aromatic hydrocarbons to obtain a lighter hydrocarbon containing phase and a heavier solvent containing phase;
(d) separating from the lighter hydrocarbon containing phase of step (c) the non-aromatic hydrocarbons by means of an extractive stripping technique; and
(e) removing the solvent from the residue of the extractive stripping step (d) by treating the residue with a liquid substance miscible with the solvent, but immiscible or only slightly miscible with the aromatic hydrocarbons.

The aromatic hydrocarbon phase obtained after removal of the solvent in step (e) is rectified to obtain the desired degree of purity of the aromatic hydrocarbons that have been thus separated.

Many advantages are obtained by the utilization of ethylenediamine as a selective solvent in terms of simplicity and high yield of aromatic hydrocarbons. Others will be apparent from the following detailed description of the invention.

DESCRIPTION OF THE PREFERRED EMBODIMENTS

The process of this invention is shown diagrammatically in the accompanying drawing which is a flow sheet of the steps involved in the practice of this invention. As indicated, this invention provides an economical and efficient means for separating aromatic hydrocarbons from mixtures thereof on the industrial scale using as a specific selective solvent ethylenediamine in a novel combination of processing steps.

According to this invention, therefore, aromatic hydrocarbons are efficiently separated from a mixture thereof with paraffins and naphthene hydrocarbons by a process comprising the steps of:

(i) extracting said mixture of liquid hydrocarbons in the liquid phase in an extraction zone at a temperature from about 40° C. to about 80° C. with ethylenediamine solvent having a water content of from 0% to 20% by weight to form an extracted phase and a raffinate phase, said extracted phase comprising predominantly aromatic hydrocarbons and solvent and a minor amount of non-aromatic hydrocarbons, said raffinate phase comprising predominantly non-aromatic hydrocarbons;
(ii) separately collecting said extracted phase and said raffinate phase;
(iii) cooling said extracted phase to a temperature at least 30° C. lower than the temperature of the extraction step (i);
(iv) separating said cooled extracted phase into a heavier solvent containing phase and a lighter hydrocarbons containing phase;
(v) separating the non-aromatic hydrocarbons in said lighter hydrocarbons containing phase as overhead product by means of extractive stripping at atmospheric pressure, said aromatic hydrocarbons remaining in the residue of the extractive stripping;
(vi) scrubbing said residue of step (v) with water thereby obtaining an aromatic hydrocarbons phase and an aqueous ethylenediamine containing phase; and
(vii) rectifying said aromatic hydrocarbons phase.

The selective solvent ethylenediamine may be employed in an anhydrous form or with a water content of up to 20% by weight. Preferably, the aqueous solvent comprises aqueous ethylenediamine with a water content of between 2 and 15% by weight. It has been found that this gives the best conditions in regard to solvent activity and selectivity towards the aromatic hydrocarbons. The use of the particular selective solvent according to the process of this invention results in many advantages.

Low ratios of solvent to feed charge are required usually in the range of 1:1 or 4:1 by weight. Where the solvent has a high water content, higher ratios may be used, for example, up to 7:1 by weight.

The extraction is preferably carried out at temperatures between about 40° C. and about 80° C., and at atmospheric pressure. It is possible, although not convenient, to operate at a temperature above 80° C. and at pressures higher than atmospheric pressure.

According to this invention, the extracted phase which is separated from the mixture has a non-aromatic hydrocarbon content of less than 1%. The raffinate phase is comprised essentially of non-aromatic hydrocarbons and a minor amount of solvent.

The extractor employed preferably should have 5 to 15 theoretical trays.

According to the practice of this invention, the extracted phase drawn from the extraction zone and containing predominantly aromatic hydrocarbons is cooled to effect separation of the extracted phase into two liquid phases. The extracted phase is cooled to at least 30° C. below the temperature at which the extraction is carried out, and preferably 40° below the extraction temperature. Preferably the temperature to which the extracted phase is cooled should be between 0° and 30° C. Upon cooling, a heavier solvent containing phase is separated from the lighter hydrocarbon containing phase and recycled to the extraction zone. The lighter hydrocarbon containing phase is in turn treated to separate the aromatic hydrocarbons contained therein.

This is effected by an extractive stripping treatment at atmospheric pressure which removes the non-aromatic hydrocarbon constituents from the aromatic constituents of the hydrocarbon containing phase.

The residue from the extractive stripping is then scrubbed with water in an amount ranging from 5 to 40% by weight and an aqueous ethylenediamine containing phase is thereby separated from a hydrocarbon phase which consists essentially of aromatic hydrocarbons. The hydrocarbon phase is in turn rectified to produce products of a high degree of purity.

The raffinate phase which is drawn from the extraction zone is scrubbed by means of water in order to separate the minor amounts of ethylenediamine solvent that are contained in the raffinate phase. The water is added in an amount such that the aqueous ethylenediamine phase which is collected has a water content of less than 50% by weight.

This is combined with the aqueous ethylenediamine from the scrubbing of the extracted stripping residue, and such combined aqueous ethylenediamine phases are distilled according to the process of U.S. 3,454,645, and then recycled to the extraction zone.

By the process of this invention, liquid hydrocarbon mixtures are extracted which contain several aromatic hydrocarbons or a single aromatic hydrocarbon is recovered from liquid mixtures containing them such as benzene from hydrogenated reforming gasoline.

Utilizing the process of this invention, pure benzene, toluene, and xylene can be separated from liquid hydrocarbon mixtures and obtained in at least 99.5% purity.

In the accompanying drawing, there is shown a schematic diagram of the steps employed in the process of this invention. The apparatus employed is all of a conventional nature familiar to those in the art and is thus not shown in detail.

Referring to this drawing, a conventional multistage extractor 1 such as a perforated tray column, or a column containing a packing material or a rotating disc contactor is employed for the extraction step.

The liquid hydrocarbon mixture which is to be separated is fed to the extractor 1 through the feed line 7 at a point intermediate between the top and the bottom of the extractor 1. The ethylenediamine selective solvent is fed to the extractor 1 through a feed line 8 at the end of the extractor at which the raffinate phase is collected.

The extracted phase containing predominantly the aromatic hydrocarbons is drawn from the extractor 1 through the line 10 and cooled in heat exchanger 24. After cooling, the extracted phase is fed to the decanter 2 through line 25 to effect separation of two liquid phases. A heavier solvent containing phase is recycled to the extractor 1 through line 11 at a point intermediate between the feeding point of the ethylenediamine selective solvent from the line 8 and the feed point of the mixture of hydrocarbons at line 7. The lighter hydrocarbon phase which is obtained by the cooling is fed to an extractive stripping column 3 through line 12.

Non-aromatic hydrocarbons are drawn from the top of the extractive stripping column 3 and recycled through line 13 to extractor 1 preferably at the same point at which the liquid hydrocarbon mixture is fed, that is, through feed line 7.

The residue of the extractive stripping is removed from the column 3 by line 14 and conveyed to a scrubbing column 4 for treatment countercurrent to water which is fed to the top of the column 3 through the feed line 15.

The aromatic hydrocarbons are drawn from the top of the scrubbing column 4 through line 16 and thereafter rectified and obtained in a high degree of purity.

Aqueous ethylenediamine is removed from the bottom of the scrubbing column 4 through line 17 and conveyed to distilling column 5 through line 17 and line 23.

The raffinate phase which has been drawn from the top of the extractor 1 is conveyed to a scrubbing column 6 through line 9 and scrubbed countercurrent to a small amount of water which is fed through the line 20 to the scrubber column 6. The non-aromatic hydrocarbon phase is drawn from the top of the column 6 through line 21.

The aqueous ethylenediamine containing phase is drawn off the bottom of column 6 to line 22 and fed through lines 22 and 23 to the distilling column 5 where it is distilled according to the process of U.S. Pat. 3,454,645 and thereafter recycled to the extractor 1 through line 18. Water is removed from the column 5 at line 19.

The practice of this invention is illustrated by an example in which a hydrocarbon mixture which contains 55% by weight benzene, toluene and xylene together with 45% of non-aromatic hydrocarbons whose number of carbon atoms range between 6 and 8 is separated into non-aromatic and aromatic hydrocarbons. The above hydrocarbon mixture is fed to the extractor 1 through line 7 at the rate of about 100 kg./hr. The hydrocarbon mixture is fed through line 7 to the extractor 1 at the fourth theoretical tray counting from the end at which the raffinate phase is collected. The extractor in this case is a rotating disc contactor having twelve theoretical trays.

The overhead product, containing predominantly non-aromatic hydrocarbons, from the extractive stripping column 3 described above is recycled through line 13 and the feed line 7 to the extractor 1.

Aqueous ethylenediamine having solvent content of 90% by weight is fed to the extractor 1 through feed line 8 at a rate of about 15 kg./hr. at the first theoretical tray at the end of the extractor 1 at which the raffinate phase is collected.

The temperature of the extraction is maintained at 60° C. and atmospheric pressure.

The extracted phase which is drawn from the bottom of the extractor 1 through line 10 has the following average composition:

| | Percent by weight |
|---|---|
| Aromatic hydrocarbons | 26.0 |
| Solvent | 73.5 |
| Non-aromatic hydrocarbons | 0.5 |

The raffinate phase which is drawn from the top of the extractor 1 through line 9 has the following average composition:

| | Percent by weight |
|---|---|
| Non-aromatic hydrocarbons | 90.5 |
| Aromatic hydrocarbons | 2.5 |
| Solvent | 7.0 |

The extracted phase is cooled in heat exchanger 24 to a temperature of about 20° C. and thereafter conveyed through line 25 to decanter 2 where it is separated into two liquid phases.

The heavier solvent phase has a solvent content of 83% by weight and after separation is recycled to the extractor 1 through line 11 at the rate of 390 kg./hr. It is fed to the extractor 1 at the third theoretical tray counting from the end at which the raffinate phase is collected.

The lighter phase which has an aromatic hydrocarbon content of 77.8% by weight is fed through line 12 to the extractive stripping column 3 where the extractive stripping is carried out at atmospheric pressure. The non-aromatic hydrocarbons are separated as the overhead products collected from column 3 and are fed to the extractor 1 through lines 13 and 7 at the rate of about 1.3 kg./hr.

At the foot of the extractive stripping column 3 a liquid product is drawn off consisting essentially of aromatic hydrocarbons and solvent. The aromatic hydrocarbon content is about 82.2% by weight. This liquid product is fed through line 14 to a scrubbing colunm 4. Water is fed to scrubbing column 4 through the feed line 15 at the rate of 14 kg./hr. Aromatic hydrocarbons are collected at the top of column 4 through line 16 at the rate of approximately 53.5 kg./hr. The aromatic hydrocarbons thus recovered are then rectified and obtained in 99.8% degree of purity.

Aqueous ethylenediamine is drawn off the bottom of column 4 and fed by lines 17 and 23 to distillation column 5 and distilled as described.

The raffinate phase which has been drawn from the top of the extractor 1 through line 9 is treated in scrubbing column 6 countercurrent to water which is fed to the scrubbing column 6 through line 20 at the rate of about 1 kg./hr.

The solvent-free raffinate is drawn from the top of the scrubbing column 6 through line 21 and the aqueous ethylenediamine containing phase drawn from the bottom of the scrubbing column 6 and fed to distillation column 5 by means of lines 22 and 23, where it is distilled according to the process of U.S. Pat. 3,454,645. Aqueous ethylenediamine is recycled to the extractor 1 through lines 18 and 8. Water is removed from the column 5 through line 19.

What is claimed is:

1. A process for separating aromatic hydrocarbons from a mixture of liquid hydrocarbons comprising said aromatic hydrocarbons, paraffins and naphthene hydrocarbons, which process comprises the steps:
   (i) extracting said mixture of liquid hydrocarbons in the liquid phase in an extraction zone at a temperature from about 40° C. to about 80° C. with ethylenediamine solvent having a water content of from 0% to 20% by weight to form an extracted phase and raffinate phase, said extracted phase comprising predominantly aromatic hydrocarbons and solvent and a minor amount of non-aromatic hydrocarbons, said raffinate phase comprising predominantly non-aromatic hydrocarbons;
   (ii) separately collecting said extracted phase and said raffinate phase;
   (iii) cooling said extracted phase to a temperature at least 30° C. lower than the temperature of the extraction step (i);
   (iv) separating said cooled extracted phase into a heavier solvent containing phase and a lighter hydrocarbon containing phase;
   (v) separating the non-aromatic hydrocarbons in said lighter hydrocarbons containing phase as overhead product by means of extractive stripping at atmospheric pressure, said aromatic hydrocarbons remaining in the residue of the extractive stripping;
   (vi) scrubbing said residue of step (v) with water thereby obtaining an aromatic hydrocarbons phase and an aqueous ethylenediamine containing phase; and
   (vii) rectifying said aromatic hydrocarbons phase.

2. A process as claimed in claim 1 wherein said ethylenediamine solvent of step (i) has a water content of from about 2% to about 15% by weight.

3. A process as claimed in claim 1 wherein the ratio of ethylenediamine solvent to said mixture of liquid hydrocarbons in step (i) is from 1:1 to 4:1 by weight.

4. A process as claimed in claim 1 wherein said extracted phase is cooled to a temperature at least 40° C. lower than the temperature of the extraction step (i).

5. A process as claimed in claim 1 wherein said extracted phase is cooled to a temperature between 0° and 30° C.

6. A process as claimed in claim 2 wherein the ratio of ethylenediamine solvent to said mixture of liquid hydrocarbons in step (i) is from 1:1 to 4:1 by weight.

7. A process as claimed in claim 6 wherein said extracted phase is cooled to a temperature between 0° and 30° C.

8. A process as claimed in claim 1 wherein said heavier solvent containing phase of step (iv) is recycled to said extraction zone, and wherein the overhead product of the extractive stripping of step (v) is recycled to said extraction zone.

9. A process as claimed in claim 8 wherein said raffinate phase collected in step (ii) is scrubbed with water and there is obtained an ethylenediamine-free raffinate phase of non-aromatic hydrocarbons and an aqueous ethylenediamine containing phase.

10. A process as claimed in claim 9 wherein the aqueous ethylenediamine containing phase of step (vi) and the aqueous ethylenediamine containing phase obtained by scrubbing the raffinate phase are distilled, and the ethylenediamine obtained thereby is recycled to the extraction zone of step (i).

11. A process as claimed in claim 10 wherein said residue of step (v) is scrubbed by means of water in an amount ranging between 5 and 40% by weight.

References Cited
UNITED STATES PATENTS

| | | | |
|---|---|---|---|
| 2,302,303 | 11/1942 | Duncan | 208—321 |
| 3,306,849 | 2/1967 | Bozeman et al. | 208—321 |
| 3,431,199 | 3/1969 | Reni et al. | 260—674 |
| 3,454,645 | 7/1969 | Barilli et al. | 260—583 |

DELBERT E. GANTZ, Primary Examiner
C. E. SPRESSER, JR., Assistant Examiner

U.S. Cl. X.R.
208—321, 324; 260—674 S.E.